(12) United States Patent
Wagener et al.

(10) Patent No.: US 12,388,811 B2
(45) Date of Patent: Aug. 12, 2025

(54) DETERMINISTIC HASH TO SECURE PERSONAL DATA AND PASSWORDS

(71) Applicant: McAfee, LLC, San Jose, CA (US)

(72) Inventors: John Wagener, West Lakeland, MN (US); Joanna Negrete, Brentwood, CA (US)

(73) Assignee: McAfee, LLC, San Jose, CA (US)

( * ) Notice: Subject to any disclaimer, the term of this patent is extended or adjusted under 35 U.S.C. 154(b) by 300 days.

(21) Appl. No.: 17/560,115

(22) Filed: Dec. 22, 2021

(65) Prior Publication Data

US 2023/0198978 A1   Jun. 22, 2023

(51) Int. Cl.
| | | |
|---|---|---|
| *H04L 29/00* | (2006.01) | |
| *G06F 21/62* | (2013.01) | |
| *H04L 9/40* | (2022.01) | |
| *H04L 67/561* | (2022.01) | |

(52) U.S. Cl.
CPC ........ *H04L 63/083* (2013.01); *G06F 21/6254* (2013.01); *H04L 63/0435* (2013.01); *H04L 67/561* (2022.05)

(58) Field of Classification Search
CPC . H04L 63/083; H04L 63/0435; H04L 67/561; H04L 63/0428; H04L 63/168; G06F 21/6254; G06F 21/31
See application file for complete search history.

(56) References Cited

U.S. PATENT DOCUMENTS

| | | | | |
|---|---|---|---|---|
| 6,601,175 | B1 * | 7/2003 | Arnold | G06F 21/31 713/184 |
| 7,725,926 | B1 * | 5/2010 | Karp | G06F 21/31 726/4 |
| 8,484,741 | B1 * | 7/2013 | Chapman | H04L 63/1483 709/206 |
| 9,386,037 | B1 * | 7/2016 | Hunt | H04L 63/1433 |
| 9,591,006 | B2 * | 3/2017 | Siva Kumar | H04L 63/10 |
| 9,647,839 | B2 * | 5/2017 | Lucas | H04L 63/083 |
| 9,977,912 | B1 * | 5/2018 | Kandamuthan | G06F 21/44 |
| 10,956,560 | B1 * | 3/2021 | Sanchez | H04L 9/3226 |
| 10,999,130 | B2 * | 5/2021 | Foster | H04L 63/1433 |
| 11,095,620 | B1 * | 8/2021 | Sirota | H04L 63/062 |
| 11,158,207 | B1 * | 10/2021 | Sadeh-Koniecpol | G06F 21/566 |
| 11,295,010 | B2 * | 4/2022 | Lowry | G06F 21/51 |
| 11,321,448 | B1 * | 5/2022 | Sanchez | H04L 9/3236 |
| 2003/0135507 | A1 * | 7/2003 | Hind | G06F 16/252 |
| 2005/0261970 | A1 * | 11/2005 | Vucina | G06Q 20/20 705/16 |
| 2008/0033740 | A1 * | 2/2008 | Cahn | G06Q 10/00 726/2 |
| 2010/0122330 | A1 * | 5/2010 | McMillan | H04L 63/12 726/6 |

(Continued)

*Primary Examiner* — Don G Zhao
(74) *Attorney, Agent, or Firm* — Patent Capital Group

(57) ABSTRACT

There is disclosed herein a computing apparatus having a hardware platform, including a processor circuit and a memory; a web-enabled application; and stored instructions within the memory to instruct the processor circuit to: determine that an input field of the web-enabled application has requested a password or personal data from a user; receive an input value; apply a deterministic function to the input value to create an obfuscated value; and provide the obfuscated value as an input to the input field.

19 Claims, 11 Drawing Sheets

(56) References Cited

U.S. PATENT DOCUMENTS

| | | | |
|---|---|---|---|
| 2011/0302012 A1* | 12/2011 | Duroux | G06Q 30/0215 |
| | | | 705/14.17 |
| 2012/0110469 A1* | 5/2012 | Magarshak | H04L 63/0421 |
| | | | 715/747 |
| 2013/0166918 A1* | 6/2013 | Shahbazi | H04L 9/0863 |
| | | | 713/183 |
| 2014/0129830 A1* | 5/2014 | Raudaschl | G06F 21/6218 |
| | | | 713/165 |
| 2014/0244429 A1* | 8/2014 | Clayton | G06Q 30/0631 |
| | | | 705/26.7 |
| 2015/0295713 A1* | 10/2015 | Oxford | H04L 9/3242 |
| | | | 713/171 |
| 2015/0350186 A1* | 12/2015 | Chan | H04L 63/0815 |
| | | | 726/9 |
| 2016/0294802 A1* | 10/2016 | Xiao | H04L 9/3226 |
| 2017/0118215 A1* | 4/2017 | Varadarajan | H04L 63/10 |
| 2017/0155634 A1* | 6/2017 | Camenisch | H04L 9/085 |
| 2017/0346851 A1* | 11/2017 | Drake | H04L 9/0838 |
| 2018/0288019 A1* | 10/2018 | Dinia | H04L 63/083 |
| 2019/0273612 A1* | 9/2019 | Sinha | H04L 69/28 |
| 2019/0347399 A1* | 11/2019 | Cramer | G06F 21/46 |
| 2020/0162255 A1* | 5/2020 | Hunt | H04L 63/083 |
| 2020/0177561 A1* | 6/2020 | Kruger | H04L 63/061 |
| 2020/0280550 A1* | 9/2020 | Lindemann | H04L 63/0428 |
| 2021/0067322 A1* | 3/2021 | Hazan | H04L 9/0643 |
| 2021/0392132 A1* | 12/2021 | Olden | H04L 67/1095 |
| 2022/0014509 A1* | 1/2022 | Walters | H04L 63/102 |
| 2022/0263655 A1* | 8/2022 | Murray | H04L 63/0823 |

* cited by examiner

DETERMINISTIC HASH TO SECURE PERSONAL DATA AND PASSWORDS

FIELD OF THE SPECIFICATION

This application relates in general to computer security, and more particularly though not exclusively to a system and method to provide a deterministic hash to secure personal data and passwords.

BACKGROUND

Many websites require passwords for authentication, and may also collect personal information that may be used for password reset or reminders.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
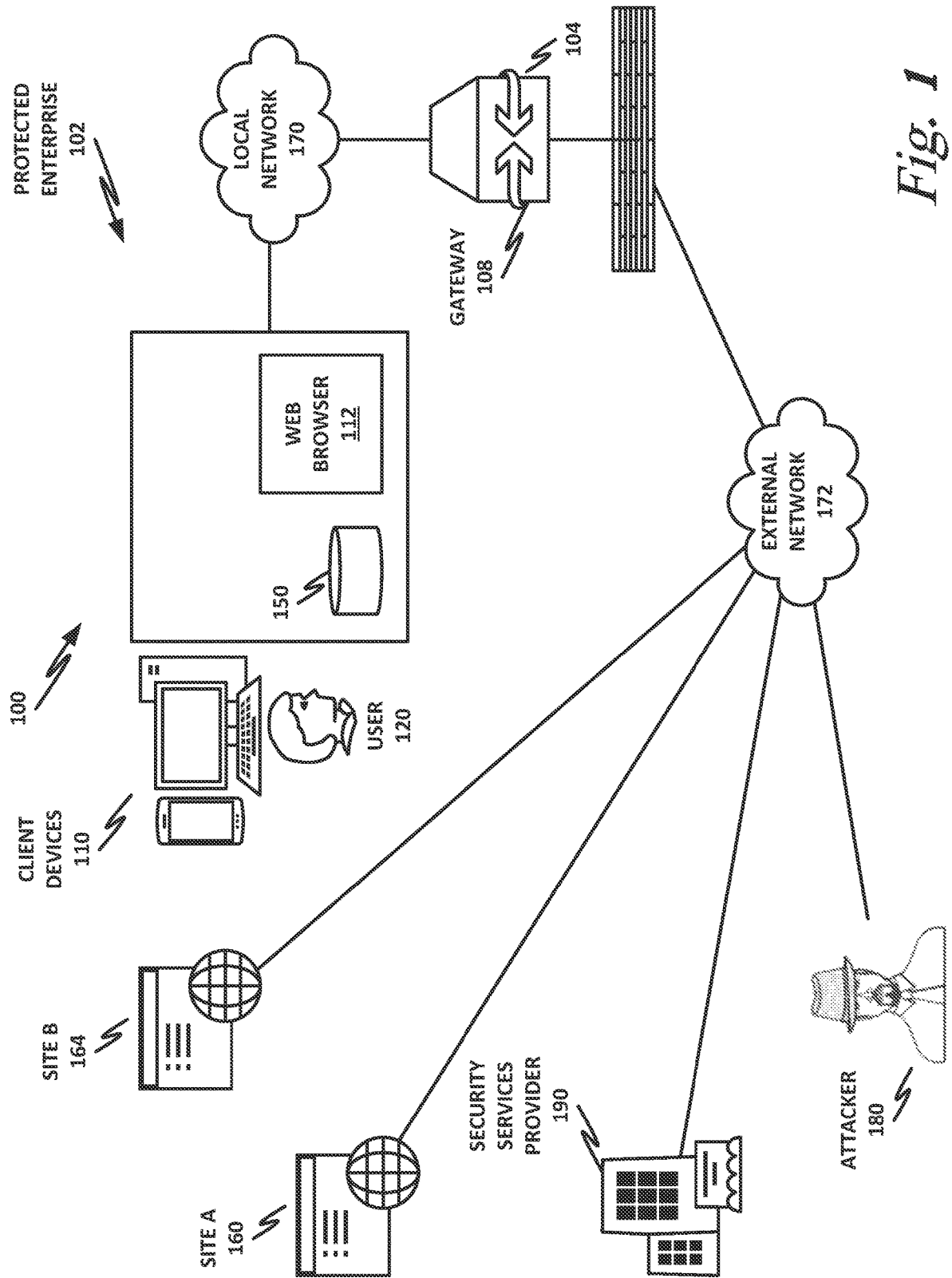
FIG. 1 is a block diagram of selected elements of a security ecosystem.

There is disclosed herein a computing apparatus having a hardware platform, including a processor circuit and a memory; a web-enabled application; and stored instructions within the memory to instruct the processor circuit to: determine that an input field of the web-enabled application has requested a password or personal data from a user; receive an input value; apply a deterministic function to the input value to create an obfuscated value; and provide the obfuscated value as an input to the input field.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Overview

Authentication is a fundamental feature of computer security. Authentication deals with granting certain rights, privileges, access, or similar based on determining that a person or a device genuinely is who he, she, or it says it is. For example, authentication abuser Jane Doe may include verifying that a user trying to log in to a web-based service truly is Jane Doe and is the same Jane Doe who previously registered an account with the service. If Jane Doe successfully registers with the service, she is provided with access to certain data or content that would be denied if she were not the authentic Jane Doe.

A common protocol for authentication is a combination of "something you know" (which, by implication, nobody else is expected to know), "something you have" (which, by implication, nobody else is expected to have), or "something you are" (which, by implication, nobody else is expected to be). The something-you-are prong generally deals in biometrics. The something-you-have prong deals in encryption keys and hardware or software tokens. The something-you-know prong generally deals with passwords or passphrases.

One problem in authentication—particularly in the case of something-you-know authentication and something-you-have authentication—is that users can lose or forget passwords or lose hardware or software tokens. Thus, password recovery has become a regular feature for websites that use password authentication. Because passwords can change and may be easy to forget, some websites or other services use a combination of other things the individual is expected to know as a gatekeeper to a password recovery service. Thus, many companies collect seemingly harmless personal information about their customers for purposes like password recovery and password reset questions.

These data may be different in nature from other types of PII. For example, some pieces of PII can be harmful, per se, if compromised. If a user's bank account information is compromised, a personal RSA encryption key, a credit card number, a Social Security number, or other highly sensitive information, then a bad actor may use these data to cause direct harm to the user. However, there are classes of information that are not harmful, per se, if lost, but in the aggregate, may be problematic. For example, a vendor may ask for personal information, such as the user's mother's maiden name, or their oldest sibling's name, or the name of a kindergarten teacher, or the name of a first pet, or the first car you owned, or some other information. These questions are generally designed to be information that a user can readily remember and is unlikely to forget.

Unfortunately, passwords and security questions are often reused across multiple sites, which means that if an attacker breaches the data of company A, then the attacker may be able to use those data to attempt to hack into the user's account for Company B.

If vendors follow best security practices—such as properly hashing all passwords and answers to security questions—then such data breaches would be less dangerous. But the user may not always know what security measures are used on a server's backend and thus may not be able to trust that every vendor receiving the user's information properly secures the data. If a vendor that does not properly secure data suffers from a data security breach and data are stolen, the user's personal information may be leaked. This can present a problem for the user and can also present a liability issue for vendors storing the user's personal information. These vendors may be required, under some laws in some jurisdictions, to protect such information.

If enough personal information is exposed about a user from multiple vendor breaches, a criminal or other bad actor can start to create a profile about the user and can further exploit the user by leveraging the information. For example, a compromised user may be a target of a spearphishing attack, in which the user is individually targeted by an attacker who has collected sufficient information about the target to appear credible as a trusted source.

A user who is security savvy and who understands the inherent risks of providing information to many different websites may take measures to protect herself. For example, Jane may use a password manager that is protected by a strong master password and may automatically generate a different password and different false answers to security questions for each site or vendor. This increases Jane's security but can present problems. For example, if Jane loses access to her password manager, then she may lose all of her saved passwords and thus be unable to log in to various web services. If Jane does not use a password manager, she may need to remember a large number of passwords and different false answers to security questions on many different websites, which can quickly become overwhelming.

Furthermore, many password managers require cloud storage to maintain the user's passwords. This requires the software to have access to the cloud storage and for security vendors to provide cloud password management and protection of those passwords. If the user is temporarily unable to access the cloud service, then she loses access to all of her passwords stored on the password manager. If the web service's password archive is breached, then the attacker would gain access to all of Jane's passwords.

The present specification provides an improved password management mechanism that prevents the exposure of personal information to websites by using a deterministic cipher or algorithm such as a deterministic cryptographic hash. This generates a site-specific response that does not contain personal information. Thus, even if the information is compromised, it cannot be reused by a hacker on other sites because it will look to the hacker like random data.

In an embodiment, a browser plug-in and/or shim application are provided that intercept a user's interactions with a website, a mobile application, or other internet-enabled application or process. The browser plug-in or shim application intercepts requests for personal information when the user visits a website that requires personal information. With the shim application installed, the user may fill in the web form as normal using, for example, a password that can be recycled from site to site and providing the same answers for personal information to many different websites. However, the user's data entry is intercepted by the shim application, which modifies the entry so that the original answer is obfuscated in a site-specific way. Thus, even if the user provides the same password or answer to two different websites, the shim application or browser plug-in will generate a unique response such that no two vendors will receive the same response to the same security question or password prompt on the vendor end. However, when the user returns to the website, she may continue to provide the same password and the same information via the web form with the obfuscation occurring transparently to her.

To assist in adhering to vendor requirements, a hashing agent may also format the obfuscated response to comply with requirements, such as length, the use of upper or lowercase letters, the use of special characters, or similar. This may be accomplished by conditioning the obfuscated response according to the original input, such as matching the number of uppercase and lowercase letters, matching the numbers of numerals and special characters, and matching the length. Alternatively, a web scraper could be used to scrape instructions from the input field to determine, for example, requirements for password length and use of uppercase, lowercase, and special characters. The web scraper may then condition the response without the user needing to attempt to match the requirements in the initial input value. This can be beneficial because different websites may have different requirements for their input forms. If the user has to craft a separate password for each website to conform to the different input requirements, then she may be back to the problem of having to remember many different passwords, even if they are subtly different only in their compliance with certain rules of different websites.

Advantageously, because the conditioned response is deterministic and does not require additional storage, in some embodiments, nothing is stored for a hacker to steal or reuse. Rather, the response may be based on the user input and a deterministic formula. Because the user input may still fall into the category of something that the user knows, she can reuse that knowledge on different websites without fear of the data being compromised because, on the backend, the data are stored as apparently random strings.

Advantageously, the present specification provides a system and method that obfuscates an individual's personal information such that the site collecting the data receives a deterministic cryptographic representation of the personal information rather than the personal information itself. Further advantageously, each site may receive a unique generated obfuscated answer that is valid only for that specific website. Further advantageously, this may prevent the leakage of personal information in phishing attacks because the user's personal information in plain text is never sent to the website in the first place. Further advantageously, embodiments of the specification pre-encrypt answers to security questions or passwords when a user enters information in his browser or mobile application. The shim or browser plug-in application intercepts the entered information and does not transmit the original answer to the vendor for backend data storage. Further advantageously, embodiments format the response consistent with vendor requirements, including, for example, capitals, punctuation requirements, special characters, and response length. Further advantageously, the obfuscated response is not susceptible to dictionary attacks because values are hashed. Thus, even if the user uses a dictionary-based word for part of his password, a dictionary attack on the backend will fail because the obfuscated password is not based on a dictionary word. Further advantageously, embodiments of the specification do not use permanent storage locally or in the cloud for information that the user chooses to obfuscate. Thus, in at least some cases, there is nothing for hackers to steal in the cloud or on the local device.

The teachings described herein prevent personal information from being transferred across the internet in clear text. This can prevent accidental leakage of personal information to phishing sites. Furthermore, this may reduce the liability for vendors that collect personal information because data are obfuscated and uniquely generated for the individual website. Thus, the vendor never receives the raw data. In some embodiments, a user-configurable option may be available so that the user can choose which websites to use obfuscated responses for and which websites to provide clear text information to.

The present specification realizes advantages over existing solutions by protecting personal information entered on one website from being used on another website. While password solutions do exist today, they may require local or cloud storage to save the results of generated passwords and then are locked in a vault for subsequent use. Differentially, the present specification provides a deterministic cryptographic hash solution using information that the user provides and information about the website to generate a unique response for each website. This can be done even if the user enters the same response for every website. This specification does not rely on the vendor company to securely store the information because the clearest text information is never sent to the vendor in the first place.

It is recognized herein that a simple hash may not meet the formatting requirements (such as special characters, capitalization, numerical characters, and length) imposed by various websites. In some embodiments, the system modifies deterministic results to adhere to these requirements, such as by mirroring the user's original input or by scraping web forms. Advantageously, the system does not require local or cloud storage, which means that if the user's device is hacked or stolen, or if the cloud provider is compromised, hackers do not gain access to any sensitive information or data. This prevents users from having to leak their personal information to vendors and helps to eliminate the risk of exposure hackers in the event of a data breach.

The foregoing can be used to build or embody several example implementations, according to the teachings of the present specification. Some example implementations are included here as nonlimiting illustrations of these teachings.

Selected Examples

The teachings of this specification may be embodied in various examples and embodiments, including the following selected examples:

There is disclosed in one example a computing apparatus, comprising a hardware platform comprising a processor circuit and a memory; a web-enabled application; and stored instructions within the memory to instruct the processor circuit to: determine that an input field of the web-enabled application has requested a password or personal data from a user; receive an input value; apply a deterministic function to the input value to create an obfuscated value; and provide the obfuscated value as an input to the input field.

There is further disclosed an example, wherein the deterministic function accounts for site metadata about a website that requested the password or personal data.

There is further disclosed an example, wherein the site metadata comprise information from a common name field of a cryptographic certificate provided by the website.

There is further disclosed an example, wherein the site metadata comprise information from a site uniform resource locator (URL) of the website.

There is further disclosed an example, wherein the site metadata comprise a top-level domain plus one additional level for the website.

There is further disclosed an example, wherein the deterministic function comprises concatenating a hash of the input value with a hash of metadata about a website that provided the input field to form a concatenated hash string.

There is further disclosed an example, wherein the deterministic function further comprises hashing the concatenated hash string and converting the hash of the concatenated hash string to a base 26 string of single-case alphabetic characters.

There is further disclosed an example, wherein the deterministic function comprises maintaining a location index of characters of one or more selected classes, and replacing a character at an indexed location with a replacement character from a selected class.

There is further disclosed an example, wherein the selected class is an uppercase character, and wherein the replacement character is an uppercase version of a character previously computed for the index location.

There is further disclosed an example, wherein the selected class is a non-alphanumeric character, and wherein the replacement character is a non-alphanumeric character provided at the indexed location in the input value.

There is further disclosed an example, wherein the selected class is a whitespace character, and wherein the replacement character is a whitespace character provided at the indexed location in the input value.

There is further disclosed an example, wherein the selected class is a numeric character, and wherein the replacement character is a numeral character computed from an alphabetic character previously computed for the indexed location.

There is further disclosed an example, wherein computing the numerical character comprises computing a modulo 10 of the alphabetic character previously computed.

There is further disclosed an example, where in the deterministic function comprises truncating the obfuscated value to a length of the input value.

There is further disclosed an example, wherein the deterministic function comprises determining a maximum length of the input field, and truncating the obfuscated value to the maximum length.

There is further disclosed an example, wherein the input value comprises a master password.

There is further disclosed an example, wherein the input value comprises a private key of a user.

There is further disclosed an example, wherein the stored instructions are further to scrape a webpage for format requirements for the input field, and wherein the deterministic function is to conform the obfuscated value to the format requirements.

There is further disclosed an example, wherein the stored instructions comprise a browser plugin.

There is further disclosed an example, wherein the stored instructions comprise a shim application.

There is further disclosed an example of one or more tangible, nontransitory computer-readable storage media having stored thereon machine-executable instructions to: obfuscate a user input according to a deterministic function; and provide the obfuscated user input in response to a prompt for a password or for personal information associated with a password.

There is further disclosed an example, wherein the deterministic function accounts for site metadata about a website that requested the password or personal data.

There is further disclosed an example, wherein the site metadata comprise information from a common name field of a cryptographic certificate provided by the website.

There is further disclosed an example, wherein the site metadata comprise information from a site uniform resource locator (URL) of the website.

There is further disclosed an example, wherein the site metadata comprise a top-level domain plus one additional level for the website.

There is further disclosed an example, wherein the deterministic function comprises concatenating a hash of the user input with a hash of metadata about a website that provided the prompt to form a concatenated hash string.

There is further disclosed an example, wherein the deterministic function further comprises hashing the concatenated hash string and converting the hash of the concatenated hash string to a base 26 string of single-case alphabetic characters.

There is further disclosed an example, wherein the deterministic function comprises maintaining a location index of characters of one or more selected classes, and replacing a character at an indexed location with a replacement character from a selected class.

There is further disclosed an example, wherein the selected class is an uppercase character, and wherein the replacement character is an uppercase version of a character previously computed for the index location.

There is further disclosed an example, wherein the selected class is a non-alphanumeric character, and wherein the replacement character is a non-alphanumeric character provided at the indexed location in the user input.

There is further disclosed an example, wherein the selected class is a whitespace character, and wherein the replacement character is a whitespace character provided at the indexed location in the user input.

There is further disclosed an example, wherein the selected class is a numeric character, and wherein the replacement character is a numeral character computed from an alphabetic character previously computed for the indexed location.

There is further disclosed an example, wherein computing the numerical character comprises computing a modulo 10 of the alphabetic character previously computed.

There is further disclosed an example, where in the deterministic function comprises truncating the obfuscated user input to a length of the user input.

There is further disclosed an example, wherein the deterministic function comprises determining a maximum length of an input field associated with the prompt, and truncating the obfuscated user input to the maximum length.

There is further disclosed an example, wherein the user input comprises a master password.

There is further disclosed an example, wherein the user input comprises a private key of a user.

There is further disclosed an example, wherein the machine-executable instructions are further to scrape a webpage for format requirements for an input field associated with the prompt, and wherein the deterministic function is to conform the obfuscated user input to the format requirements.

There is further disclosed an example, wherein the machine-executable instructions comprise a browser plugin.

There is further disclosed an example, wherein the machine-executable instructions comprise a shim application.

There is further disclosed an example of a computer-implemented method, comprising: obfuscating user input values according to a deterministic hash function; and providing the obfuscated values as substitute inputs to an internet-based form.

There is further disclosed an example, wherein the deterministic hash function accounts for site metadata about a website that provided the internet-based form.

There is further disclosed an example, wherein the site metadata comprise information from a common name field of a cryptographic certificate provided by the website.

There is further disclosed an example, wherein the site metadata comprise information from a site uniform resource locator (URL) of the website.

There is further disclosed an example, wherein the site metadata comprise a top-level domain plus one additional level for the website.

There is further disclosed an example, wherein the deterministic hash function comprises concatenating a hash of an input value with a hash of metadata about a website that provided the internet-based form to form a concatenated hash string.

There is further disclosed an example, wherein the deterministic hash function further comprises hashing the concatenated hash string and converting the hash of the concatenated hash string to a base 26 string of single-case alphabetic characters.

There is further disclosed an example, wherein the deterministic hash function comprises maintaining a location index of characters of one or more selected classes, and replacing a character at an indexed location with a replacement character from a selected class.

There is further disclosed an example, wherein the selected class is an uppercase character, and wherein the replacement character is an uppercase version of a character previously computed for the index location.

There is further disclosed an example, wherein the selected class is a non-alphanumeric character, and wherein the replacement character is a non-alphanumeric character provided at the indexed location in an input value.

There is further disclosed an example, wherein the selected class is a whitespace character, and wherein the replacement character is a whitespace character provided at the indexed location in an input value.

There is further disclosed an example, wherein the selected class is a numeric character, and wherein the replacement character is a numeral character computed from an alphabetic character previously computed for the indexed location.

There is further disclosed an example, wherein computing the numerical character comprises computing a modulo 10 of the alphabetic character previously computed.

There is further disclosed an example, where in the deterministic hash function comprises truncating the obfuscated values to a length of an input value.

There is further disclosed an example, wherein the deterministic hash function comprises determining a maximum length of an input field of the internet-based form, and truncating the obfuscated values to the maximum length.

There is further disclosed an example, wherein the user input values comprise a master password.

There is further disclosed an example, wherein the user input values comprise a private key of a user.

There is further disclosed an example, further comprising scraping a webpage for format requirements for an input field of the internet-based form, and wherein the deterministic hash function is to conform the obfuscated values to the format requirements.

There is further disclosed an example of apparatus comprising means for performing the method.

There is further disclosed an example, wherein the means for performing the method comprise a processor and a memory.

There is further disclosed an example, wherein the memory comprises machine-readable instructions that, when executed, cause the apparatus to perform the method.

There is further disclosed an example, wherein the apparatus is a computing system.

There is further disclosed an example of at least one computer readable medium comprising instructions that, when executed, implement a method or realize an apparatus as described.

DETAILED DESCRIPTION OF THE DRAWINGS

A system and method for providing a deterministic hash to secure personal data and passwords will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Security ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the Internet, via external network 172. External network 172 may similarly be any suitable type of network.

Local network 170 may connect to the Internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 could be a simple home router, or could be a sophisticated enterprise infrastructure including routers, gateways, firewalls, security services, deep packet inspection, web servers, or other services.

In further embodiments, gateway 108 may be a standalone Internet appliance. Such embodiments are popular in cases in which ecosystem 100 includes a home or small business. In other cases, gateway 108 may run as a virtual machine or in another virtualized manner. In larger enterprises that features service function chaining (SFC) or NFV, gateway 108 may be include one or more service functions and/or virtualized network functions.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180.

Protected enterprise 102 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

User 120 operating client devices 110 may wish to access websites, such as site A 160 and site B 164. In accessing site A 160 and site B 164, the user may create account credentials including a password, password reminders, or security questions that may be used for password reset. User 120 could also submit PII or other sensitive information to the websites, and thus it may be advantageous for client device 120 to obfuscate information sent to sites A 160 and B 164. If attacker 180 were to compromise one of the sites, it is possible that the compromise of one site could lead to compromise of the other site, such as by gleaning information from one site that is useful on another site.

Security services provider 190 may provide a plug-in to web browser 112 or a shim application that intercepts communications and web forms as user 120 operates client device 110. The browser plug-in or shim application may provide obfuscation services as illustrated throughout this specification so that data will not be compromised by attacker 180.

Figure 2:
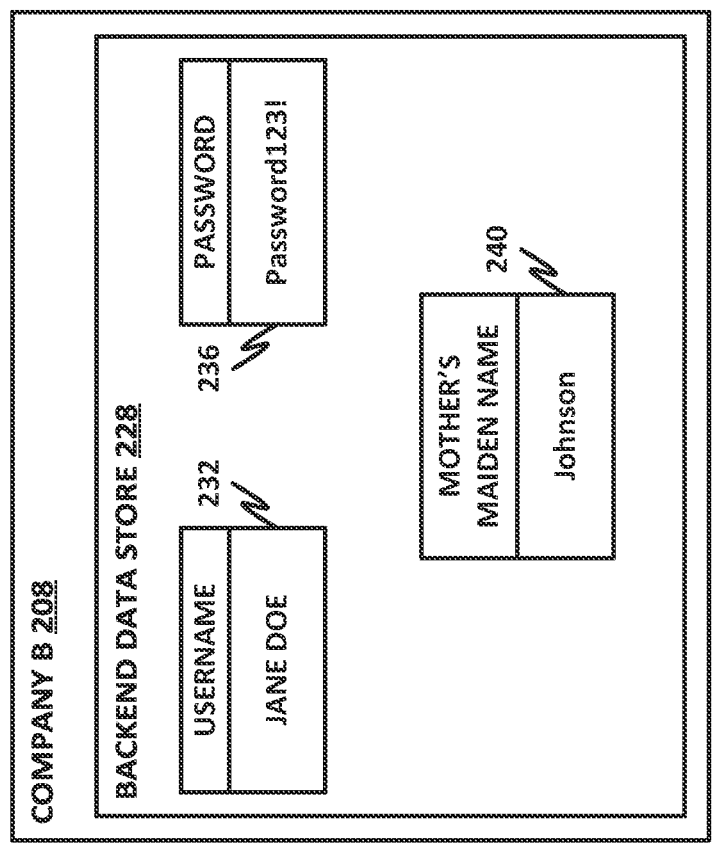
FIG. 2 is a block diagram illustrating selected aspects of cross-site contamination.
Figure 2:
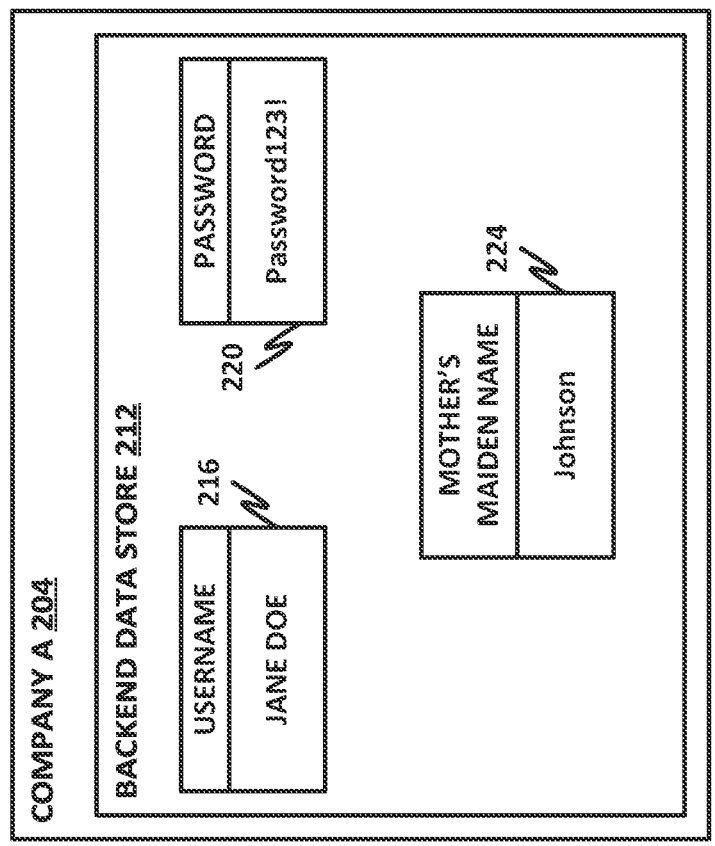

FIG. 2 is a block diagram illustrating selected aspects of cross-site contamination. In the example of FIG. 2, company A 204 and Company B 208 both include backend data stores. For example, company A 204 provides backend data store 212, and company B 208 provides backend data store 228. A user may have registered an account with both company A 204 and company B 208. The user has entered her name as Jane Doe for username 216 and provided a password such as Password123! on backend data store 212 of company A 204. Furthermore, company A 204 has prompted the user to enter her mother's maiden name 224 as a security question for if the user needs to do a password reset.

Similarly, on backend data store 228 of company B 208, the user has entered the same username 232, the same password, and the same mother's maiden name 240.

In this hypothetical example, company A 204 may observe good security practices and may, for example, store password 220 and mother's maiden name 224 as hash values that are not human readable. However, company B 208 may not be as security conscious and may store password 236 and mother's maiden name 240 as clear text values on backend data store 228.

If an attacker—for example, using a social engineering or similar attack—were to compromise backend data store 228, the attacker may gain access to username 232, password 236, and mother's maiden name 240. Thus, although company A 204 is security conscious and maintains best security practices by not storing data in clear text, the attacker now has access to the same values that were entered on backend data store 212. Thus, by gaining access to company B 208, the attacker may also gain access to information in company A 204. User Jane Doe may have had her information compromised even though company A 204 follows good security practices.

Figure 3:
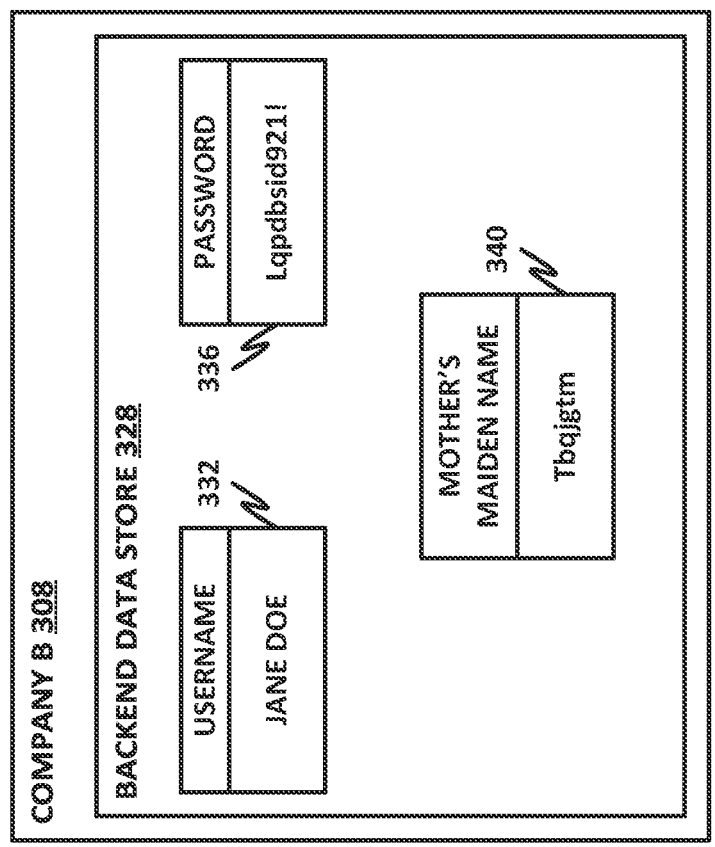
FIG. 3 is a block diagram of selected elements of a password storage ecosystem.
Figure 3:
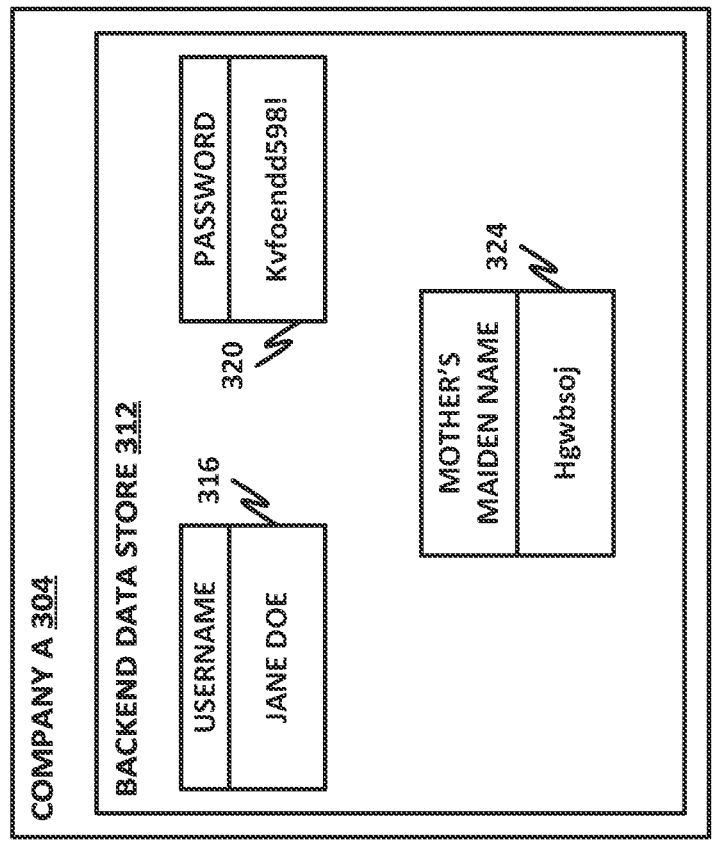

FIG. 3 shows a contrasting embodiment in which user Jane Doe operates a computer with a hashing engine as described in this specification. In this case, the user enters her same username, Jane Doe 316, on backend data store 312 of company A 304. Similarly, user Jane Doe enters her username 332 in backend data store 328 of company B 308. Furthermore, Jane Doe has entered the same password, Password123!, and the same mother's maiden name, Johnson, on the websites of both company A 304 and company B 308. Both of these companies have stored the values in their backend data stores 312 and 328, respectively.

As before, company A 304 may follow best security practices and store password 320 and mother's maiden name 324 as hash values only rather than in clear text. However, company B 308 may not follow best security practices and may have stored password 336 and mother's maiden name 340 in clear text on backend data store 328. As before, an attacker may use a social engineering or other attack to gain access to data of company B 308, including data from backend data store 328. However, in this case, when the attacker examines the data, he will find that the username Jane Doe 332 is assigned to the user, but the password and the mother's maiden name appear to be a random string of meaningless letters. This may be expected for a password, which often consists of random strings of letters. But in the case of mother's maiden name 340, it may be expected that it will be a human-readable name that is understandable. Thus, the attacker may be frustrated when he encounters mother's maiden name 340. Although the value was stored in clear text, because the value is obfuscated before it was sent to company B 308, the attacker may gain no useful information from the data store.

Notably, although Jane Doe may have used the same username, password, and mother's maiden name on both websites, backend data store 312 has different values stored for password 320 and mother's maiden name 324. Because these values were obfuscated on both websites before being sent to the vendor, and because the ops obfuscation was website-specific, different values are stored. Advantageously, Jane Doe need not remember different passwords or different answers for each website. She can enter the same username, password, mother's maiden name, and other value on each website that she encounters. Because she uses a security agent as described herein, the security agent may obfuscate the values and thus preserve her privacy and data integrity even if she recycles data across different websites.

Figure 4:
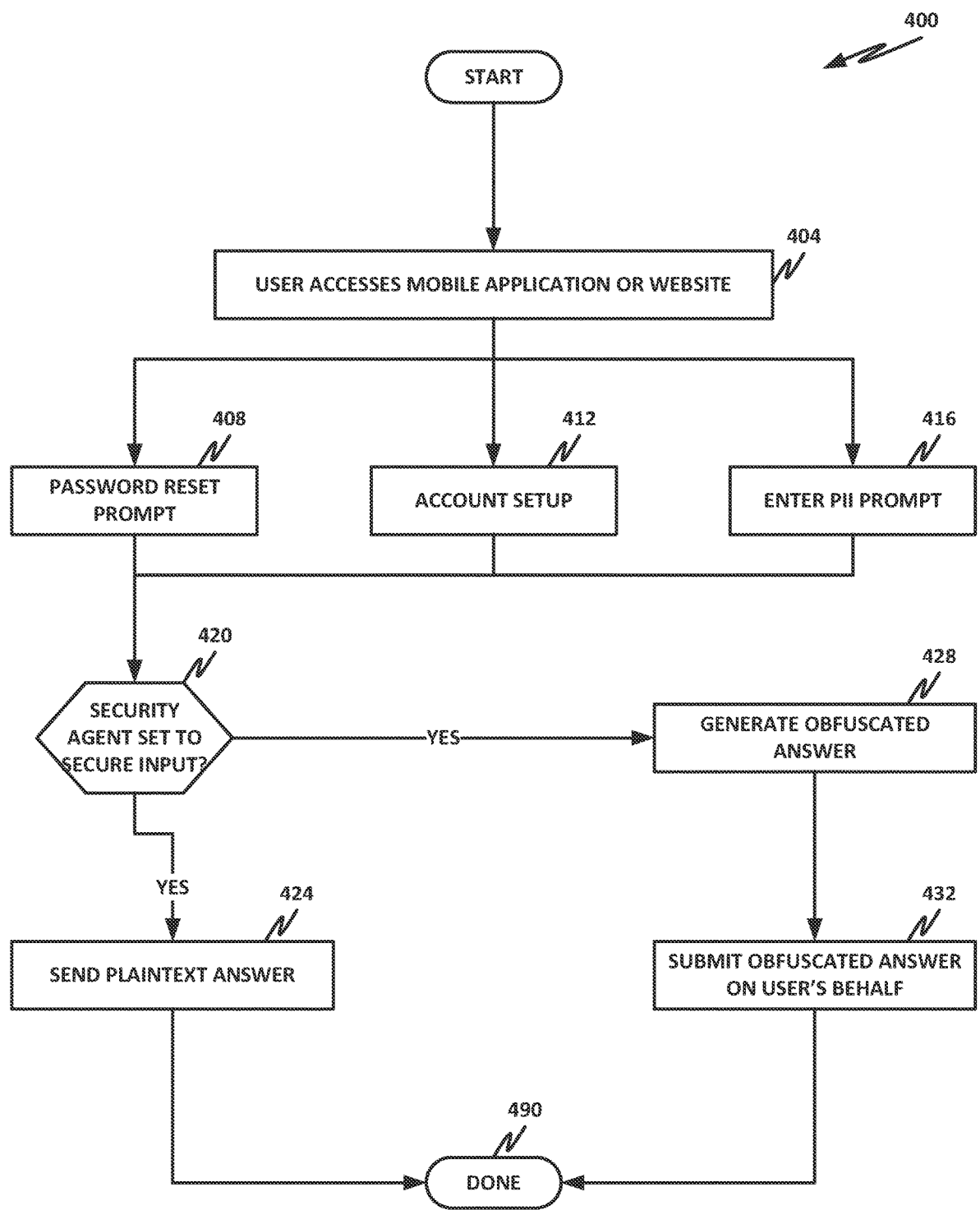
FIG. 4 is a flowchart of a method of securing user inputs.

FIG. 4 is a flowchart of a method 400 of securing user inputs.

Method 400 starts in block 404 when a user accesses an internet-based resource, such as a mobile application or a website. This could be via a browser or via a web-enabled application. In either case, the application may prompt the user to enter some personal information, such as a password or other PII.

In blocks 408, 412, and 416, there are illustrated various prompts that the user may receive. These are illustrative and nonlimiting examples of prompts. In block 408, the user may be prompted with a password reset prompt. This is, for example, if the user has lost her password and wishes to reset the password. In block 412, the user may be setting up a new account with the service and may need to provide a new password. In block 416, the user may be prompted to provide PII, including less sensitive PII. For example, the user's privacy and security may not be breached, per se, by an attacker knowing her mother's maiden name. Rather, knowing her mother's maiden name may allow the attacker to compromise her account on a different web service.

Following from blocks 408, 412, 416, or some other similar prompt, in decision block 420, the system determines whether the security agent is currently set to secure the input. In some cases, this may be a real-time prompt to the user, such as by asking the user "do you want to obfuscate input?" or something similar. In other cases, the setting may be configured on a per-website or per-data type basis. For example, it may be desirable not to obfuscate some types of inputs. The user may need to enter a genuine email address, phone number, or other information that may be used for communication with the user. Furthermore, in some cases, the user may want to enter real information. For example, some websites may provide perks or gifts on the user's birthday, and so the user may wish to enter her genuine birthdate so that she can receive these perks or gifts. In other cases, data such as mother's maiden name, first pet, color of first car, which high school you attended, your high school's mascot, or other common questions that are used for password reset security questions may better be obfuscated.

Flowing from decision block 420, if the user elects not to obfuscate the response, then in block 424, a plaintext answer is sent to the web service. In other words, the browser plug-in or shim application does not interfere with the communication, and the data are sent as normal.

Figure 5:
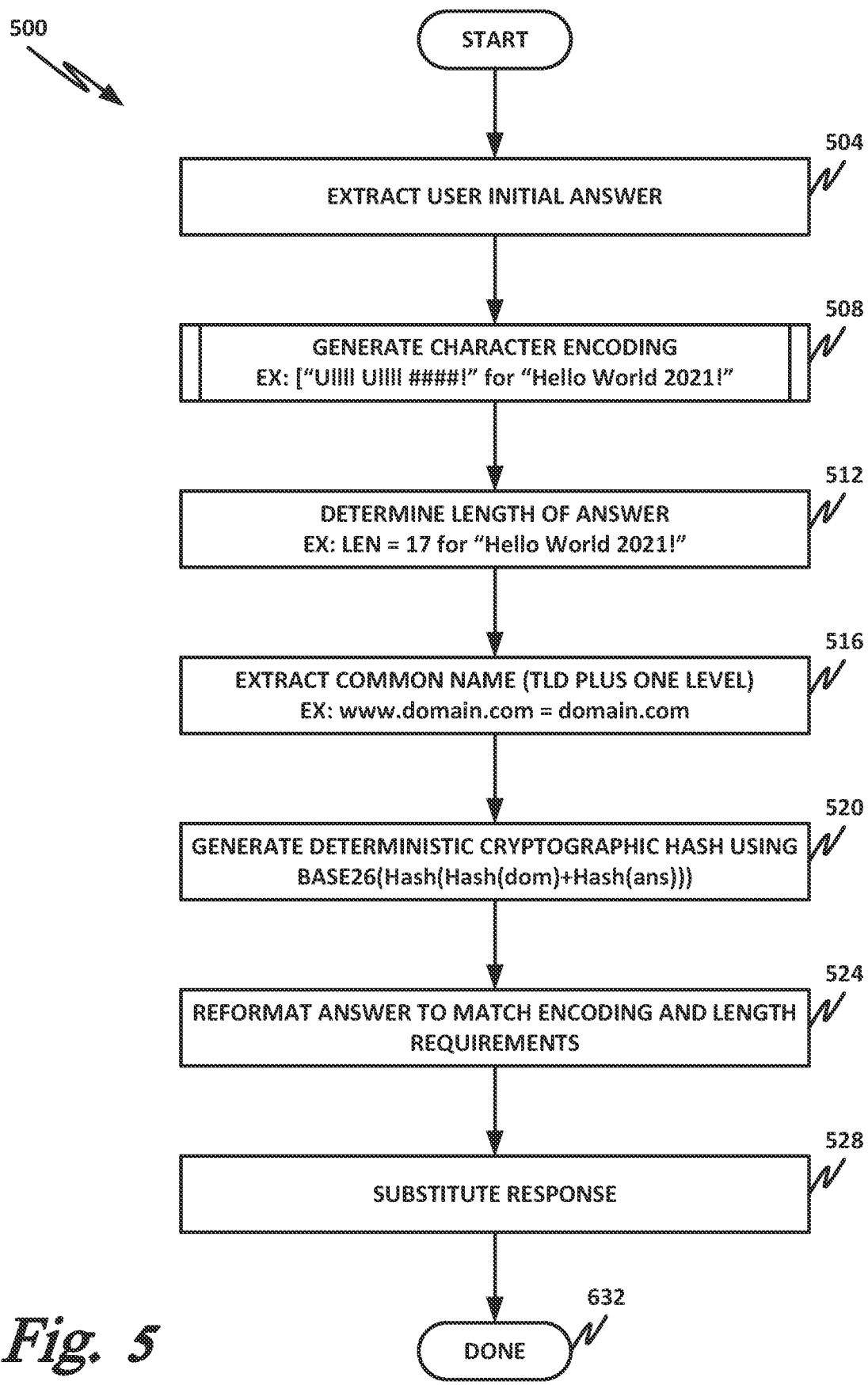
FIG. 5 is a flowchart of a method of obfuscating an answer.
Figure 6:
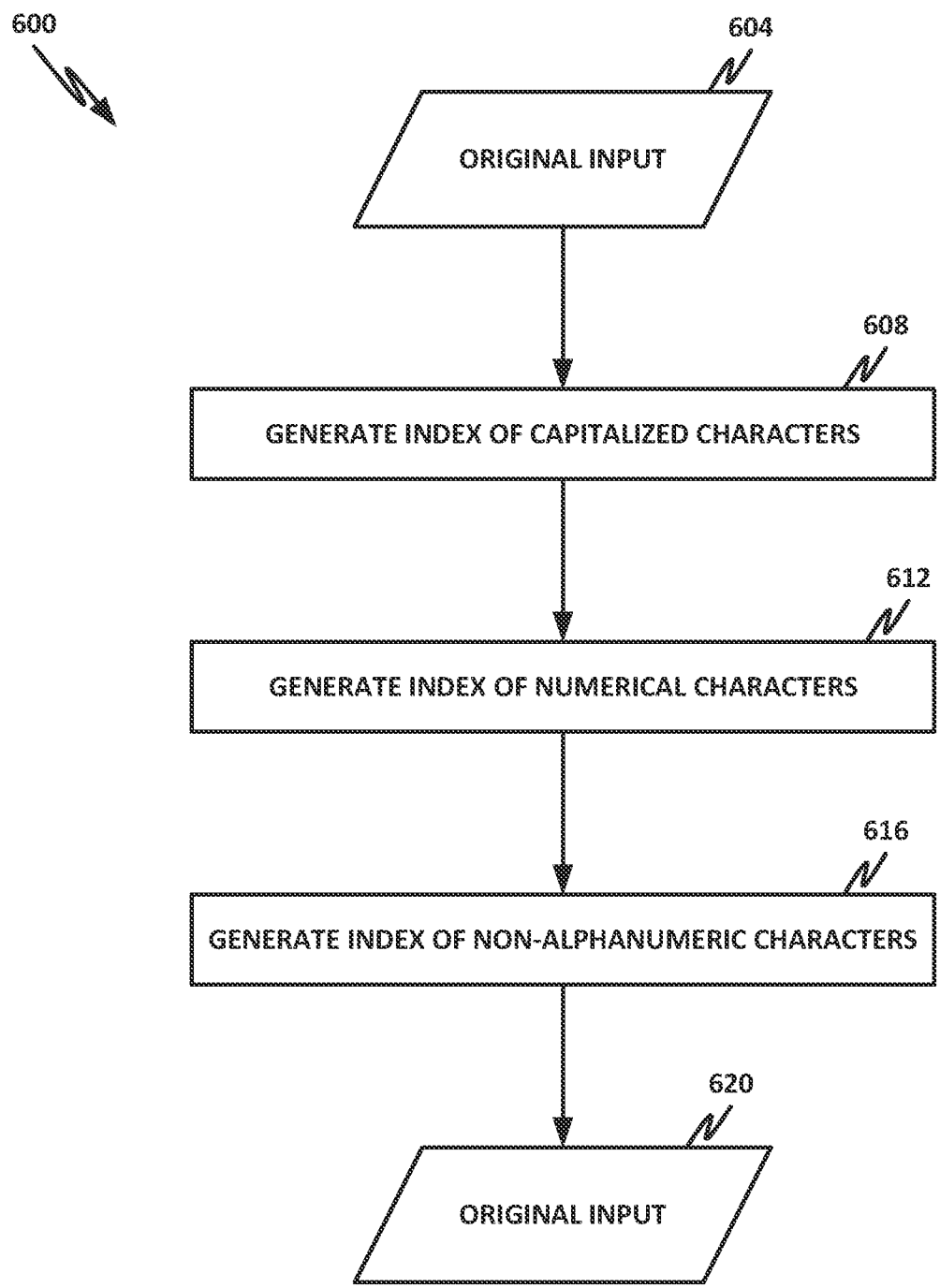
FIG. 6 is a flowchart of a a subprocess to method of FIG. 5.

Returning to decision block 420, if the user elects to secure the answer or modify the response, then the security agent may modify the response using, for example, a method as illustrated in FIG. 5 and FIG. 6 below, or some similar method. Note that the process may be the same whether the user is entering information on the website for the first time, such as when setting up an account, or when the user is entering the information later, such as when the answer is used for a password reset as a security question. Beneficially, securing the answer using the same determinative algorithm in both cases helps to ensure that the security agent does not block useful access to the website. For example, it is easy to provide a random or meaningless password or random or meaningless answer to security questions. But if these cannot be replicated at a later time, the user may experience frustration as she tries to access the website later. Because a determinative hashing algorithm is used in this specification, as long as the user provides the same password or answer to the same website, the determinative algorithm will generate the same obfuscated response both at initial setup and later if the user needs to perform a password reset.

Note that in the case of an obfuscated answer, the generated response may be unique to the website where the information is being entered and is not reused elsewhere.

Thus, in block 428, the system generates the obfuscated answer, and in block 432, the system generates the obfuscated answer on the user's behalf. This may happen transparently to the user. In the case of a user configuration setting, it may happen automatically, and the user need not even see that an obfuscated answer has been entered. In the case of a prompt, after the user has answered affirmatively to a prompt, such as "secure the response?" the obfuscation happens transparently.

In block 490, the method is done.

FIG. 5 is a flowchart of a method 500 of obfuscating an answer. Method 500 starts in block 504 when the user provides an input string as a response to a prompt or an input field on a web form. In block 504, the system extracts the initial user answer from the provided input. For example, the user may provide as an answer, such as a password or as a response to a security question, "Hello World 2021!"

In block 508, the system may generate a character encoding from the response. For example, the character encoding may indicate which characters are white space, which characters are uppercase, which characters are lowercase, which characters are numeric, and which characters are special characters. In some cases, an index location for each class of characters may be provided, such as indexing position 0 as a capital character, position 5 as a white space character, position 6 as in uppercase character, position 11 as a white space character, positions 12 through 15 as numerals, and position 16 as a special character or a nonalphanumeric character. In some cases, in addition to indexing the positions of these character classes, at least some of the character classes may receive the stored literal character. For example, the white space characters may be stored as literals and the special characters may be stored as literals so that they can be inserted into the final obfuscated string later. Note that this is a nonlimiting example only, and in other cases, white space characters, special characters, and other character classes may be computed from the hashed string provided by the algorithm. As long as the characters computed are determinative, then the algorithm will work.

Note that block 508 is illustrated here as a subprocess that is provided in more detail in FIG. 6.

In block 512, the system may determine the length of the provided answer. For example, the system may determine here that the length of the string "Hello World 2021!" is 17 characters. This may be used later to truncate the final answer to the same length of string.

In block 516, the system extracts site metadata about the website that is providing the form or requesting the input. For example, the common name may be extracted from the website certificate if a transport layer security (TLS) connection is provided. This common name may provide the top-level domain as well as subdomains. In the case of a connection that is not HTTPS, then the domain name may be extracted from the uniform resource locator (URL). In an example, the top-level domain plus one level is used as the site metadata value. In the case of www.domain.com, the top-level domain (.com) plus one additional level (domain) may be used as the site metadata value to provide "domain.com." Note that in the case of non-US websites, the top-level domain may be deemed to include both the top-level domain and the country code. Thus, for a domain, domain.co.uk, the .co.uk portion is considered the top-level domain (TLD), and domain is considered the next level plus one. Thus, the site metadata for that domain would be domain.co.uk.

Advantageously, by using TLD plus one level, some difficulties may be obviated that may otherwise arise as URLs change. For example, some websites may use different subdomains for load-balancing or may direct to different subdomains to provide different resources. These can change over time. For example, if a load balancer directs the user to www2.domain.com on one visit and then directs the user to www3.domain.com on another visit, then different site metadata values would result if TLD plus two levels were used. Furthermore, if the full URL were used, then even greater difficulty could be encountered because URLs may include HTML POST and GET codes that can change frequently. For the determinative algorithm to work, it is preferable for the same site metadata value to be preserved across different visits. Because it is uncommon for a company or a web service provider to change its domain name, this may be expected to persist for a long time. This helps to ensure that the same site metadata value can be used across many different visits so that the same hash value is provided.

In block 520, the system generates a deterministic cryptographic hash. In this example, the system may use the algorithm base 26 (Hash(Hash(domain)+Hash(answer))). Stated otherwise, a cryptographic hash algorithm, such as SHA256, may be used for the hash function. The user's input answer is hashed and the domain name or site metadata value provided in block 516 is also hashed. This yields two hash strings. The two hash strings may then be concatenated. The concatenated string may then also be hashed. This generates a final result that is not easily brute force attacked and expands the number of characters back to all alphabetic characters. In pseudocode, this is:

```
Base26AlphaFromHex (
  SHA256 (
    SHA256 (domain) + SHA256 (answer)
  )
)
```

The hashed concatenation of the two hashes can then be converted to base 26, which yields a string of alphabetic characters of a single case, such as lowercase.

To provide a concrete example, if the user visits the domain domain.co.uk and uses as her password "IHateCats 2021*," then the user's original answer is hashed to yield
  SHA256("IHateCats2021*")=a4a810d4547a1e3fe5f3 b8fc9419cd98cedb4e6ab4d60c942a11f0fcaa68f027

Similarly, the domain name in the form of TLD plus one level is hashed as a candidate salt value. Hashing domain.co.uk provides:
  SHA256("domain.co.uk")=b6a5e76f57a75e722b8 421798cafda230aafe7c870597a9598b04b01f0534a77

The two strings are then concatenated together to yield:
a4a810d4547a1e3fe5f3b8fc9419cd98
cedb4e6ab4d60c942a11f0fcaa68f027
b6a5e76f57a75e722b8421798cafda23
0aafe7c870597a9598b04b01f0534a77

This long alphanumeric string is also hashed. For example,
  SHA256("a4a810d4547a1e3fe5f3b
  8fc9419cd98cedb4e6ab4d60c942a11f0fc
  aa68f027b6a5e76f57a75e722b84217
  98cafda230aafe7c870597a9598b04b01   f0534a
  77")=45a21840169697efdbf7a3c7bcfc
  dd8e11c6cc0683cfb941861e02522b713da4

The hashed value can then be converted to an alphabetic string using the function base 26 alpha from X.
  Base26AlphaFromHex
    ("45a21840169697efdbf7a3c7bcfcdd8e11c6cc0683cf
    b941861e02522b713da4")=aeyayu-
    zhdkguuwzrjadsdqlzivnivigmtektihpugptctxturfkxmkb This provides a baseline alphabetic string in all lowercase levels that can be used to provide the obfuscated result.

In block 524, the system reformats the answer to match the encoding and length requirements of the website.

For example, the alpha string may be converted to re-encode it to match the original string according to the index locations of uppercase characters, whitespace characters, numeric values, and special characters.

In the case of uppercase characters, the lowercase character at the corresponding index in this string is simply converted to uppercase. Thus, in the original string at positions 0, 1, and 6, there were uppercase characters. The new alphabetic characters at positions 0, 1, and 6 are converted to uppercase:
  AEyayuZhdkguuwzrjadsdqlzivnivigmtektihpugptctx-
  turfkxmkb For whitespace characters, whitespace characters may be reinserted as literal characters in the same position they occupied in the original answer. Similarly, nonalphanumeric or special characters may also be reinserted as character literals in the same position that they occupied in the original string (in this case, a space is inserted at position 9):
  AEyayuZhd guuwzrjadsdqlzivnivigmtektihpugptctx-
  turfkxmkb The location index may also include the location of several numeric characters that were provided in the original string. Rather than insert the same numeric characters, the new alphabetic characters that were computed in the base 26 alpha computation are converted to numeric values. In one illustration, the function modulo 10 is used to convert each character to a number based on its ASCII value. For example, the ASCII value of the character at the appropriate index is identified and a modulo 10 is computed for that character. Modulo 10 ensures that the answer will be between zero and nine, thus providing a single-digit numeric character.

In this illustration, the characters guuw are provided in the same position that were indexed as numeric characters in the original input. Modulo 10 is computed for each of those as illustrated.

103% 10=3(q)

117% 10=7(u)

117% 10=7(u)

119% 10=9(w)

The result is:
  AEyayuZhd 3779zrjadsdqlzivnivigmtektihpugptctx-
  turfkxmkb

A special character ("*") was also used in the original password. Special characters could be computed as a function of the lowercase character at the same position, or the same literal character may be inserted at that position. Here, the same literal character is used:
  AEyayuZhd 3779*rjadsdqlzivnivigmtektihpugptctx-
  turfkxmkb The new password string may also be truncated to match the original response.
  AEyayuZhd 3779*

Thus, the final response has the same number of characters as the original response, has uppercase characters in the same locations, has whitespace and special characters (and optionally the same whitespace and same literal special characters) as the original input, and has numerals in the same positions as in the original input, and is of the same length. Thus, assuming that the original response conformed to the website's requirements for a password or response, the new response should also comply.

In block 528, a site-specific response is substituted for the user's original response. Since the domain is used as part of the determinate deterministic cryptographic hash, no two sites will have the same response to the same question, and thus each site has a site-specific response. This is true even if the user provides the same initial response as the original input. This prevents an attacker from stealing personal information because the personal information is never transmitted to the vendor and thus cannot be stored locally or at the vendor location.

This can be especially beneficial for phishing attacks that attempt to gain personal information via web forms. In the case of the present system, the personal data are never sent. Thus, even if the user is a victim of a phishing attack, the user will provide only obfuscated and thus useless information to the phishing operator. Even in the event of a password phishing attempt, the password generated for the phishing site will not be the same as the one generated for the legitimate site because the phishing site will have a different URL and a different domain name from the legitimate site.

Advantageously, this system can be used to generate passwords without storing any information locally or can be used in the cloud and can be used with other security questions. This removes the need to store generated passwords in the cloud or on the user's machine so that the only information stored is in the user's mind.

Note that in some cases, the user may not even need to provide an answer. For example, the user could simply provide a master password that is used to unlock the application at each use. The master password may then be used as the input value seed in the deterministic hashing algorithm. This master password could be used for both the password and for the prompts for password reset questions. In some cases, it may be beneficial to provide different responses for a password and for a password reset prompt. In fact, some websites will not even allow a same response in these two different fields. Thus, if the user's master password and the site top-level domain plus one are used as the only seeds, the same value will be generated, and this may cause difficulties. In some cases, a web scraper could be used to scrape information, such as the field label for each field. The field label could then be used as an additional seed to the deterministic hashing algorithm. In this case, the user need not enter anything other than the single master password, and the program can then generate responses for the password field and for password reset questions or other data that the user wishes to have masked. Furthermore, in addition to or instead of a single master password, a user's private key, such as the private key in an RSA key pair, could be used as the input field seed. Other embodiments are also possible.

FIG. 6 is a flowchart of a method 600 that is a subprocess to method 500 of FIG. 5. For example, method 600 may be a subprocess of block 508. Method 600 illustrates the indexing of certain types of characters.

The system initially receives original input 604. In block 608, the system may generate an index of capitalized characters. An index could be a mask that is used as a proxy for the full user input. For example,

| Abbreviation | Description |
|---|---|
| l | Lowercase alpha character |
| U | Uppercase alpha character |
| # | Numerical character |
| <preserve character> | Special Character |

In some cases, special characters are to be preserved, such as the asterisk in "IHateCats 2021*". Special characters of whitespace, such as the space character, may also be preserved as literals, similar to other special characters. Numerical positions will be indexed for numeric characters, such as 2021 and "IHateCats 2021*". Uppercase character positions will be preserved as a position index but may not necessarily be preserved as literals.

Thus, in block 608, the system generates an index of capitalized characters. This index indicates a position, such as a zero-based position of characters that contain capital letters.

In block 612, the system may also generate an index of numerical characters. This indicates the numerical index, such as a zero-based index of characters that were numeric characters in the original input.

In block 616, the system may also generate an index of nonalphanumeric characters or special characters. This could include both visible special characters, such as asterisk, exclamation point, quote, backslash, front slash, or similar. Different website operators may have different alphanumeric characters that they accept. One benefit of preserving the literal characters for special characters is that if the user provides special characters that comply with the websites instructions, those same literal characters can be used in the calculated hash and will thus help the calculated hash also comply with the website's requirements. Thus, in the case of nonalphanumeric or special characters, both the index position of the character and the literal character may be preserved so that, in the final output string, the same literal character can be inserted at the same position.

In block 620, an index mask may be provided. For example, in the case of "IHateCats 2021*", the index mask may be UUlllUlll ####*. This simple index mask can then be used to condition the final output value, such as inserting the literal space and literal special characters provided at the appropriate positions, converting lowercase characters to uppercase characters at the appropriate position, and converting lowercase letters to numeric characters at the appropriate positions as described above.

Figure 7:
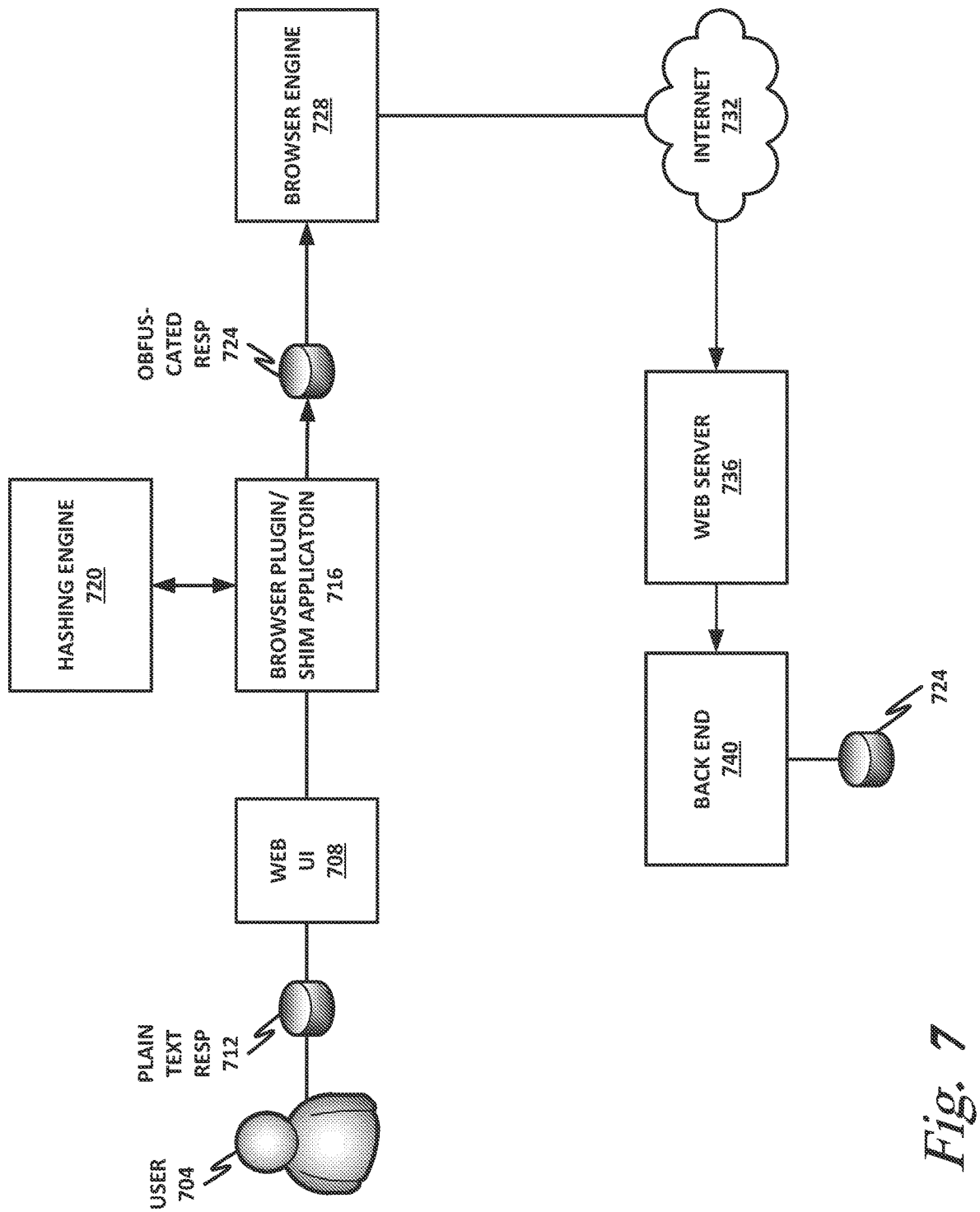
FIG. 7 is a block diagram of a data processing pipeline.

FIG. 7 is a block diagram of a data processing pipeline. In the data processing pipeline, a user 704 provides a plaintext response 712 within a web UI 708. This could be a form on a web browser or some other internet-enabled application.

Browser plug-in or shim application 716 operates hashing engine 720 to create an obfuscated response 724 according to the teachings of the present specification. The obfuscated response 724 may then be provided to browser engine 728, which receives obfuscated response 724 in place of plaintext response 712. Browser engine 728 then transmits obfuscated response 724 via internet 732 to web server 736, which may be operated by a website or a service provider. Website 730 includes a backend 740, which stores data, which may include passwords and PII. However, backend 740 never receives plaintext response 712 but instead receives only obfuscated response 724. Thus, obfuscated response 724 is stored on backend 740. Even if the website operator does not follow best security practices and stores obfuscated response 740 as a clear text string, a compromise of backend 740 will not compromise the security of user 704 because obfuscated response 724 will be meaningless to an attacker or phishing operator.

Figure 8:
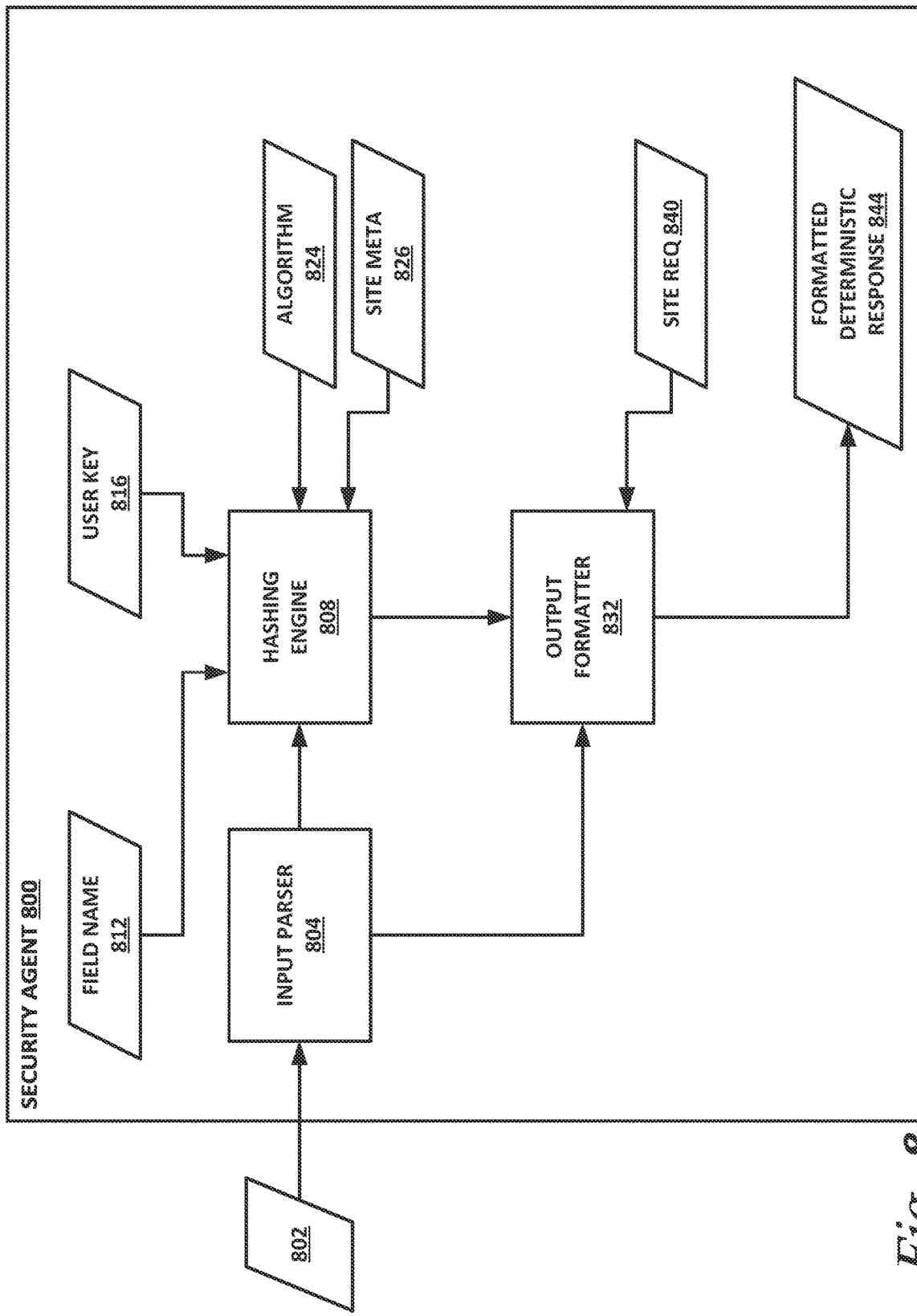
FIG. 8 is a block diagram of selected elements of a security agent.

FIG. 8 is a block diagram of selected elements of a security agent 800. Security agent 800 includes elements such as an input parser 804, a hashing engine 808, and an output formatter 832. In an illustrative example, security agent 800 receives an original and obfuscated user input 802 into input parser 804. Input parser 804 parses the input and provides the input to hashing engine 808. Hashing engine 808 may provide a deterministic algorithm 826. Deterministic algorithm 826 may use one or more seeds to provide a hashed value. In an illustrative example, algorithm 824 is a combination of SHA256 hashes in combination with a base 26 conversion and additional format conditioning.

Hashing engine 808 may receive site metadata 826, such as a top-level domain name plus one level. It may also include input from input parser 804, which can be used to generate the input. In some cases, hashing engine 808 may also include a field name which can be scraped from the web form, a user key, such as an RSA private key, a master password, or other inputs. Hashing engine 808 then computes a computed alphabetic or alphanumeric string according to algorithm 824.

The computed string may be provided to output formatter 832, which formats the output to comply with certain requirements. For example, output formatter 832 may receive original input from input parser 804 and may generate an index that includes the position of uppercase letters, lowercase letters, special characters, and numerals. In some cases, the index may also include the character literal values for special characters and whitespace characters.

Optionally, in addition to or instead of the response index, the output formatter 832 may receive site requirements 840. For example, a web scraper could be used to scrape the instructions from the password instructions on a web form. A heuristic or other machine-learning engine could then be used to determine the requirements for a particular website. Thus, the literal special characters need not be replicated from the original user input, and upper and lowercase letters need not appear at the same position. A deterministic algorithm could be used to compute different positions, different special characters, and different whitespace characters if desired. Furthermore, in the case of a master password, rather than per-field user input, the deterministic algorithm may be used along with a screen scrape to simply identify the password requirements. In the case where user inputs are not collected for each field but instead a master password or encryption key is used, it may be desirable to store scraped instructions on password format in length because those stored instructions may be used to later re-create the same response according to the deterministic hashing algorithm.

Output formatter 832 may also truncate the computed input string to match the original user input. Alternatively, a screen scraper could determine the maximum length of the field from a scrape of the website. The output could then be truncated to the maximum permissible length. This may further help to ensure user privacy and security. For example, if the user inputs an eight-character password, but the password field allows up to 30 characters, then output formatter 832 may truncate the password to 30 characters, thus providing a 30-character password for the website. This can help to increase user privacy and security.

In block 844, the formatted deterministic response is provided and can then be sent to the website operator.

Figure 9:
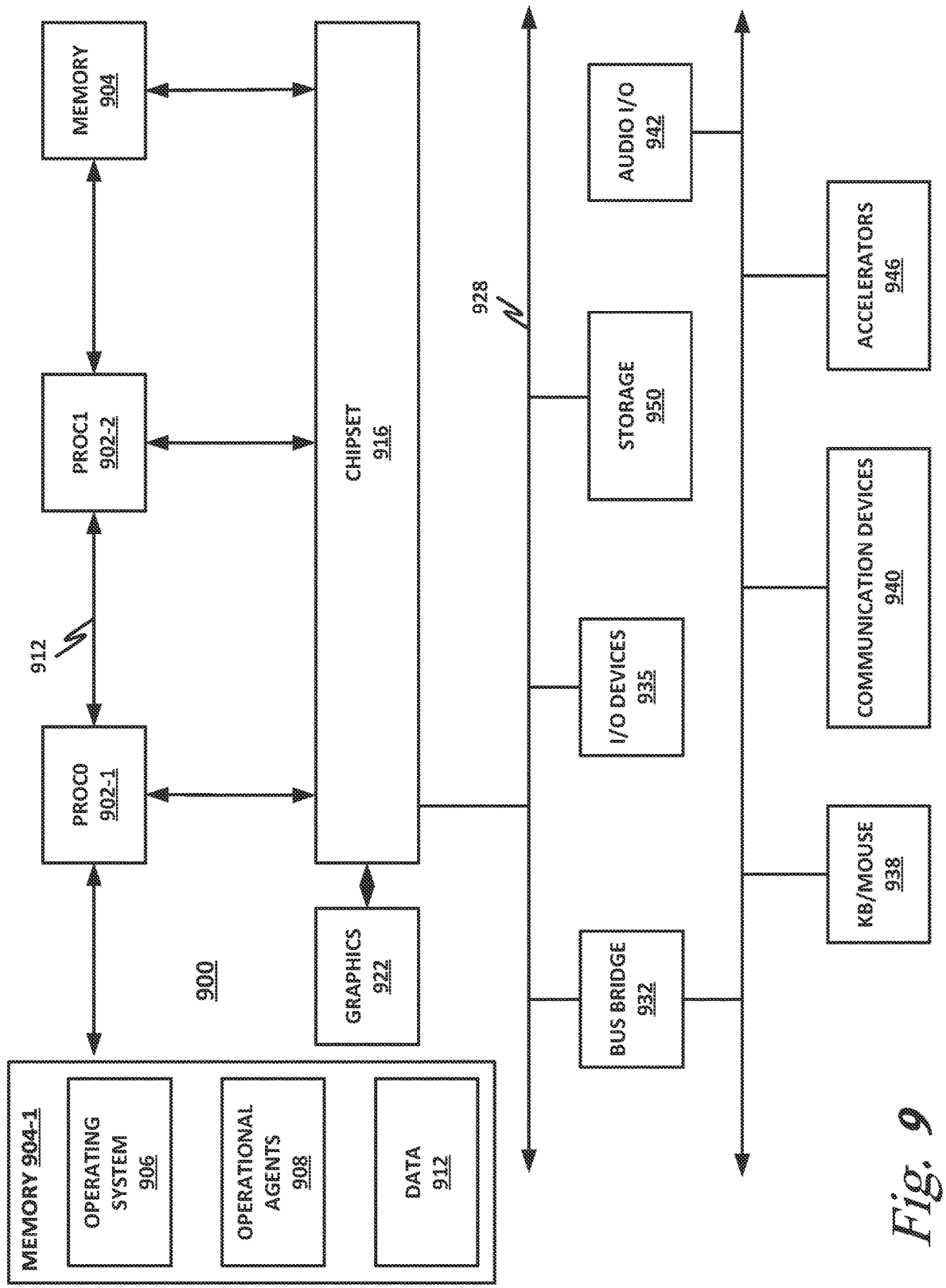
FIG. 9 is a block diagram of selected elements of a hardware platform.

FIG. 9 is a block diagram of a hardware platform 900. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 900, even though they may be scattered across a data center, or even located in different data centers.

Hardware platform 900 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 900 is arranged in a point-to-point (PtP) configuration. This PtP configuration is popular for personal computer (PC) and server-type devices, although it is not so limited, and any other bus type may be used.

Hardware platform 900 is an example of a platform that may be used to implement embodiments of the teachings of this specification. For example, instructions could be stored in storage 950. Instructions could also be transmitted to the hardware platform in an ethereal form, such as via a network interface, or retrieved from another source via any suitable interconnect. Once received (from any source), the instructions may be loaded into memory 904, and may then be executed by one or more processor 902 to provide elements such as an operating system 906, operational agents 908, or data 912.

Hardware platform 900 may include several processors 902. For simplicity and clarity, only processors PROC0 902-1 and PROC1 902-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 902 may be any type of processor and may communicatively couple to chipset 916 via, for example, PtP interfaces. Chipset 916 may also exchange data with other elements, such as a high performance graphics adapter 922. In alternative embodiments, any or all of the PtP links illustrated in FIG. 9 could be implemented as any type of bus, or other configuration rather than a PtP link. In various embodiments, chipset 916 may reside on the same die or package as a processor 902 or on one or more different dies or packages. Each chipset may support any suitable number of processors 902. A chipset 916 (which may be a chipset, uncore, Northbridge, Southbridge, or other suitable logic and circuitry) may also include one or more controllers to couple other components to one or more central processor units (CPU).

Two memories, 904-1 and 904-2 are shown, connected to PROC0 902-1 and PROC1 902-2, respectively. As an example, each processor is shown connected to its memory in a direct memory access (DMA) configuration, though other memory architectures are possible, including ones in which memory 904 communicates with a processor 902 via a bus. For example, some memories may be connected via a system bus, or in a data center, memory may be accessible in a remote DMA (RDMA) configuration.

Memory 904 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 904 may be used for short, medium, and/or long-term storage. Memory 904 may store any suitable data or information utilized by platform logic. In some embodiments, memory 904 may also comprise storage for instructions that may be executed by the cores of processors 902 or other processing elements (e.g., logic resident on chipsets 916) to provide functionality.

In certain embodiments, memory 904 may comprise a relatively low-latency volatile main memory, while storage 950 may comprise a relatively higher-latency nonvolatile memory. However, memory 904 and storage 950 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 904 and storage 950, for example, in a single physical memory device, and in other cases, memory 904 and/or storage 950 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 922 may be configured to provide a human-readable visual output, such as a command-line interface (CLI) or graphical desktop such as Microsoft Windows, Apple OSX desktop, or a Unix/Linux X Window System-based desktop. Graphics adapter 922 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 922 may include a hardware graphics card, which may have its own memory and its own graphics processing unit (GPU).

Chipset 916 may be in communication with a bus 928 via an interface circuit. Bus 928 may have one or more devices that communicate over it, such as a bus bridge 932, I/O devices 935, accelerators 946, communication devices 940, and a keyboard and/or mouse 938, by way of nonlimiting example. In general terms, the elements of hardware platform 900 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 940 can broadly include any communication not covered by a network interface and the various I/O devices described herein. This may include, for example, various universal serial bus (USB), FireWire, Lightning, or other serial or parallel devices that provide communications.

I/O Devices 935 may be configured to interface with any auxiliary device that connects to hardware platform 900 but that is not necessarily a part of the core architecture of hardware platform 900. A peripheral may be operable to provide extended functionality to hardware platform 900, and may or may not be wholly dependent on hardware platform 900. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 942 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 932 may be in communication with other devices such as a keyboard/mouse 938 (or other input devices such as a touch screen, trackball, etc.), communication devices 940 (such as modems, network interface devices, peripheral interfaces such as PCI or PCIe, or other types of communication devices that may communicate through a network), audio I/O 942, a data storage device 944, and/or accelerators 946. In alternative embodiments, any portions of the bus architectures could be implemented with one or more PtP links.

Operating system 906 may be, for example, Microsoft Windows, Linux, UNIX, Mac OS X, iOS, MS-DOS, or an embedded or real-time operating system (including embedded or real-time flavors of the foregoing). In some embodiments, a hardware platform 900 may function as a host platform for one or more guest systems that invoke application (e.g., operational agents 908).

Operational agents 908 may include one or more computing engines that may include one or more nontransitory computer-readable mediums having stored thereon executable instructions operable to instruct a processor to provide operational functions. At an appropriate time, such as upon booting hardware platform 900 or upon a command from operating system 906 or a user or security administrator, a processor 902 may retrieve a copy of the operational agent (or software portions thereof) from storage 950 and load it into memory 904. Processor 902 may then iteratively execute the instructions of operational agents 908 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 900 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fiber Channel, InfiniBand, Wi-Fi, or other suitable standard. Intel Omni-Path Architecture (OPA), TrueScale, Ultra Path Interconnect (UPI) (formerly called QuickPath Interconnect, QPI, or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 900 may be virtualized, in particular the processor(s) and memory. For example, a virtualized environment may run on OS 906, or OS 906 could be replaced with a hypervisor or virtual machine manager. In this configuration, a virtual machine running on hardware platform 900 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 9 may be combined in a SoC architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIGURE QC. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 10:
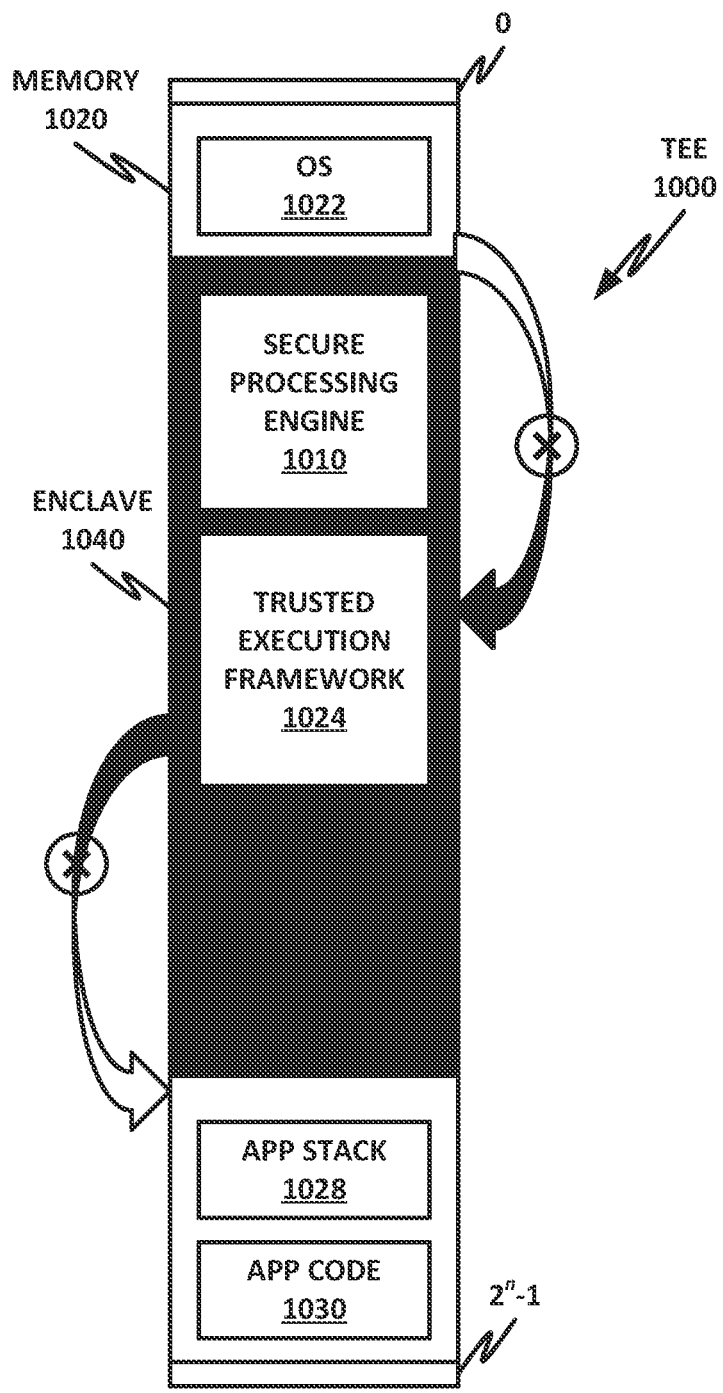
FIG. 10 is a block diagram of selected elements of a trusted execution environment (TEE).

FIG. 10 is a block diagram of a TEE 1000.

In the example of FIG. 10, memory 1020 is addressable by n-bits, ranging in address from 0 to $2^n-1$ (note, however, that in many cases, the size of the address space may far exceed the actual memory available). Within memory 1020 is an OS 1022, enclave 1040, application stack 1020, and application code 1030.

In this example, enclave 1040 is a specially-designated portion of memory 1020 that cannot be entered into or exited from except via special instructions, such as Intel Software Guard Extensions (SGX) or similar. Enclave 1040 is provided as an example of a secure environment which, in conjunction with a secure processing engine 1010, forms a TEE 1000 on a hardware platform such as platform 900 of FIG. 9. A TEE 1000 is a combination of hardware, software, and/or memory allocation that provides the ability to securely execute instructions without interference from outside processes, in a verifiable way. By way of example, TEE 1000 may include memory enclave 1040 or some other protected memory area, and a secure processing engine 1010, which includes hardware, software, and instructions for accessing and operating on enclave 1040. Nonlimiting examples of solutions that either are or that can provide a TEE include Intel SGX, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, secure processing engine 1010 may be a user-mode application that operates via trusted execution framework 1024 within enclave 1040. TEE 1000 may also conceptually include processor instructions that secure processing engine 1010 and trusted execution framework 1024 require to operate within enclave 1040.

Secure processing engine 1010 and trusted execution framework 1024 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 1022 may be excluded from TCB, in addition to the regular application stack 1028 and application code 1030.

A key manager 1026 is located within the TCB, and provides functionality consistent with the teachings of this specification. For example, key manager 1026 may be an embodiment of . . . .

Key manager 1026 may be used in the case that a security agent needs to store any values, such as scraped inputs, a user encryption key, or other user data. While some embodiments of the present specification do not require storage of any values except information known in the user's mind, some embodiments may wish to store certain data to ensure integrity and consistency across different uses. For example, if a website's URL changed, it may be useful to store the URL that was used to generate a particular obfuscated password. In other cases, if data are scraped by a web scraper, then it may be useful to store the fields, as those may also change relatively frequently.

In cases where data are stored, a TEE may be a useful construct to ensure that the user's passwords or private data or keys are not compromised by outside applications while the security agent is running.

In certain systems, computing devices equipped with Intel SGX or equivalent instructions may be capable of providing an enclave 1040. It should be noted, however, that many other examples of TEEs are available, and TEE 1000 is provided only as one example thereof. Other secure environments may include, by way of nonlimiting example, a virtual machine, sandbox, testbed, test machine, or other similar device or method for providing a TEE 1000.

In an example, enclave 1040 provides a protected memory area that cannot be accessed or manipulated by ordinary computer instructions. Enclave 1040 is described with particular reference to an Intel SGX enclave by way of example, but it is intended that enclave 1040 encompass any secure processing area with suitable properties, regardless of whether it is called an "enclave."

One feature of an enclave is that once an enclave region 1040 of memory 1020 is defined, as illustrated, a program pointer cannot enter or exit enclave 1040 without the use of special enclave instructions or directives, such as those provided by Intel SGX architecture. For example, SGX™ processors provide the ENCLU[EENTER], ENCLU[ERESUME], and ENCLU[EEXIT]. These are the only instructions that may legitimately enter into or exit from enclave 1040.

Thus, once enclave 1040 is defined in memory 904, a program executing within enclave 1040 may be safely verified to not operate outside of its bounds. This security feature means that secure processing engine 1010 is verifiably local to enclave 1040. Thus, when an untrusted packet provides its content to be rendered with trusted execution framework 1024 of enclave 1040, the result of the rendering is verified as secure.

Enclave 1040 may also digitally sign its output, which provides a verifiable means of ensuring that content has not been tampered with or modified since being rendered by secure processing engine 1010. A digital signature provided by enclave 1040 is unique to enclave 1040 and is unique to the hardware of the device hosting enclave 1040.

Figure 11:
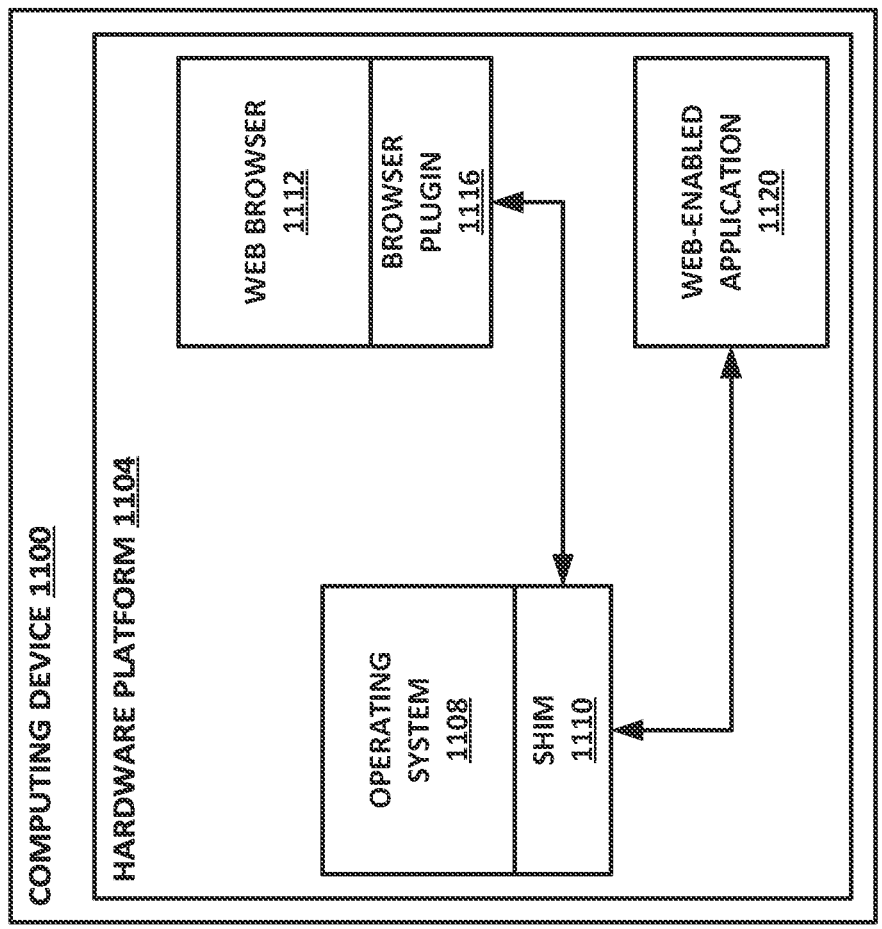
FIG. 11 is a block diagram of a computing device.

FIG. 11 is a block diagram of a computing device 1100. Computing device 1100 includes a hardware platform 1104, which may be, for example, an embodiment of a hardware platform as illustrated in FIG. 9. Hardware platform 1104 may provide a processor circuit and/or a memory and may have stored therein machine-executable instructions for carrying out certain functions, including functions illustrated in FIGS. 4, 5, and 6 below, and elsewhere throughout the specification.

Hardware platform 1104 includes an operating system 1108, which provides the basic functionality for software within computing device 1100. Computing device 1100 also includes a web browser 1112 and a web-enabled application 1120. Web browser 1112 and web-enabled application 1120 communicate the operating system 1108 with outside resources such as internet domains.

A shim application 1110 may be closely coupled to operating system 1108 and may mediate communication services. Thus, it may not be necessary to make any changes directly to web-enabled application 1120 but simply to insert shim 1110 between web-enabled application 1120 and operating system 1108. Shim 1110 can then intercept input fields as necessary to provide the functions of the present specification.

Similarly, web browser 1112 may include a browser plug-in 1116. Browser plug-in 1116 may be a relatively light plug-in that simply intercepts input fields, and interfaces to shim 1110 which provides the security agent. Shim 1110 can then process and obfuscate input data provided to certain input fields within web browser 1110.

The foregoing outlines features of several embodiments so that those skilled in the art may better understand various aspects of the present disclosure. The foregoing detailed description sets forth examples of apparatuses, methods, and systems relating to a system for providing a deterministic hash to secure personal data and passwords in accordance with one or more embodiments of the present disclosure. Features such as structure(s), function(s), and/or characteristic(s), for example, are described with reference to one embodiment as a matter of convenience; various embodiments may be implemented with any suitable one or more of the described features.

As used throughout this specification, the phrase "an embodiment" is intended to refer to one or more embodiments. Furthermore, different uses of the phrase "an embodiment" may refer to different embodiments. The phrases "in another embodiment" or "in a different embodiment" refer to am embodiment different from the one previously described, or the same embodiment with additional features. For example, "in an embodiment, features may be present. In another embodiment, additional features may be present." The foregoing example could first refer to an embodiment with features A, B, and C, while the second could refer to an embodiment with features A, B, C, and D, with features, A, B, and D, with features, D, E, and F, or any other variation.

In the foregoing description, various aspects of the illustrative implementations may be described using terms commonly employed by those skilled in the art to convey the substance of their work to others skilled in the art. It will be apparent to those skilled in the art that the embodiments disclosed herein may be practiced with only some of the described aspects. For purposes of explanation, specific numbers, materials, and configurations are set forth to provide a thorough understanding of the illustrative implementations. In some cases, the embodiments disclosed may be practiced without the specific details. In other instances, well-known features are omitted or simplified so as not to obscure the illustrated embodiments.

For the purposes of the present disclosure and the appended claims, the article "a" refers to one or more of an item. The phrase "A or B" is intended to encompass the "inclusive or," e.g., A, B, or (A and B). "A and/or B" means A, B, or (A and B). For the purposes of the present disclosure, the phrase "A, B, and/or C" means A, B, C, (A and B), (A and C), (B and C), or (A, B, and C).

The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a volatile or nonvolatile memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, nontransitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, nontransitory computer-readable storage media having stored thereon executable instructions that, when executed, cause a hardware platform or other computing system, to carry out a method or procedure. For example, the instructions could be executable object code, including software instructions executable by a processor. The one or more tangible, nontransitory computer-readable storage media could include, by way of illustrative and nonlimiting example, a magnetic media (e.g., hard drive), a flash memory, a ROM, optical media (e.g., CD, DVD, Blu-Ray), nonvolatile random access memory (NVRAM), nonvolatile memory (NVM) (e.g., Intel 3D Xpoint), or other nontransitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

To aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computing apparatus, comprising:
a hardware platform comprising a processor circuit and a memory;
a web-enabled application; and
stored instructions within the memory to instruct the processor circuit to:
determine that a user has visited a website via the web-enabled application, and that an input field of the website has requested a password or personal data from the user;
receive, for the input field, an input value associated with the user;
apply a deterministic function to the input value to create an obfuscated value, the obfuscated value being an output of the deterministic function calculated based on the input value and an identity of the website, wherein the deterministic function replaces one or more characters at specific locations of the input value with characters selected from one or more special character classes, and maintains an index of the one or more characters at the specific locations; and provide the obfuscated value to the input field.

2. The computing apparatus of claim 1, wherein the identity of the website is based on metadata about the website.

3. The computing apparatus of claim 2, wherein the metadata about the website comprise information from a common name field of a cryptographic certificate provided by the website.

4. The computing apparatus of claim 2, wherein the metadata about the website comprise information from a site uniform resource locator (URL) of the website.

5. The computing apparatus of claim 2, wherein the metadata about the website comprise a top-level domain plus one additional level for the website.

6. The computing apparatus of claim 2, wherein the deterministic function comprises concatenating a hash of the input value with a hash of metadata about the website to form a concatenated hash string.

7. The computing apparatus of claim 6, wherein the deterministic function further comprises hashing the concatenated hash string and converting the hash of the concatenated hash string to a string of single-case alphabetic characters.

8. The computing apparatus of claim 1, wherein the one or more special character classes include an uppercase character, and wherein a selected character is replaced with an uppercase version of a character previously computed for a specific location.

9. The computing apparatus of claim 1, wherein the one or more special character classes include a non-alphanumeric character, and wherein a selected character is a replaced with a non-alphanumeric character provided at a selected location.

10. The computing apparatus of claim 1, wherein is the one or more special character classes include a whitespace character, and wherein a selected character is replaced with a whitespace character provided at a selected location.

11. The computing apparatus of claim 1, wherein the one or more special character classes include a numeric character, and wherein a selected character is replaced with a numeral character computed from a modulo 10 of an alphabetic character previously computed for a selected location.

12. The computing apparatus of claim 1 where in the deterministic function comprises truncating the obfuscated value to a length of the input value.

13. The computing apparatus of claim 1, wherein the deterministic function comprises determining a maximum length of the input field, and truncating the obfuscated value to the maximum length.

14. The computing apparatus of claim 1, wherein the stored instructions comprise a browser plugin or shim application.

15. One or more tangible, non-transitory computer-readable storage media having stored thereon machine-executable instructions to:

determine that a user has visited a website with an input field;

receive, for the input field, an input value associated with the user;

obfuscate the input value according to a deterministic function, wherein an output of the deterministic function is an obfuscated value based on the input value and an identity of the website, and wherein the deterministic function replaces one or more characters at specific locations of the input value with characters selected from one or more special character classes, and maintains an index of the one or more specific locations; and provide the obfuscated value to the input field in response to a prompt for a password or for personal information from the website.

16. The one or more tangible, non-transitory computer-readable storage media of claim 15, wherein the identity of the website includes a uniform resource locator (URL) for the website.

17. The one or more tangible, non-transitory computer-readable storage media of claim 15, wherein the deterministic function comprises concatenating a hash of the input value with a hash of metadata about the website to form a concatenated hash string.

18. A computer-implemented method, comprising:

for a website, identifying an input form that has requested a password or personal information for a user;

receiving a user input value for the input form;

obfuscating the user input value according to a deterministic function, wherein an output of the deterministic function is an obfuscated value based on the user input value and an identity of the website, wherein the obfuscated value has replaced one or more characters at specific locations of the input value with characters selected from one or more special character classes, and maintains an index of the one or more specific locations; and providing the obfuscated value as a substitute input to the website.

19. The method of claim 18, wherein the deterministic function comprises concatenating a hash of the user input value with a hash of metadata about the website to form a concatenated hash string.

* * * * *